(No Model.)

L. HINKLE.
COMBINATION TOOL.

No. 474,384. Patented May 10, 1892.

Witnesses
Jno. G. Hinkel
Will E. Neff

Inventor
Leonard Hinkle
by J. A. Watson
Attorney

UNITED STATES PATENT OFFICE.

LEONARD HINKLE, OF INDIANAPOLIS, INDIANA.

COMBINATION-TOOL.

SPECIFICATION forming part of Letters Patent No. 474,384, dated May 10, 1892.

Application filed August 3, 1891. Serial No. 401,547. (No model.)

*To all whom it may concern:*

Be it known that I, LEONARD HINKLE, a citizen of the United States, residing at Indianapolis, in the county of Marion and State of Indiana, have invented certain new and useful Improvements in Combination-Tools, of which the following is a specification.

My invention relates to combination-tools; and it consists in various novel features of construction and arrangement of parts which will be hereinafter described.

Figure 1:
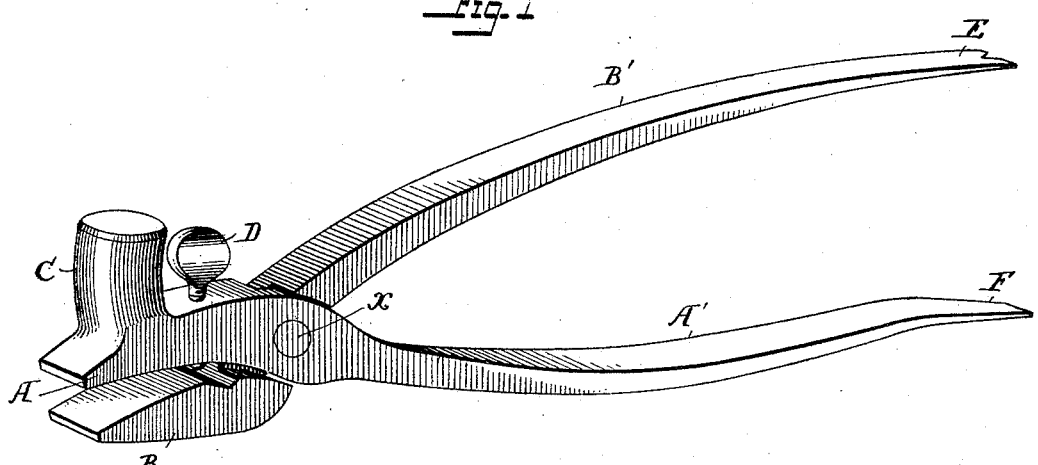
Figure 2:
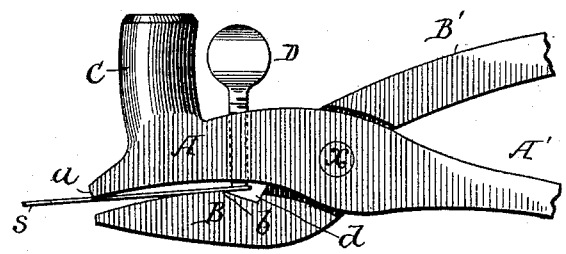
Figure 3:
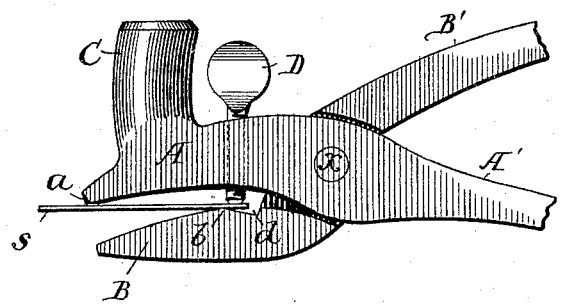

In the accompanying drawings, in which similar reference-signs refer to like parts throughout the several views, Figure 1 is a perspective view of my invention, and Figs. 2 and 3 are partial side views illustrating one of the uses to which the tool is adapted.

My improved combination-tool consists in a pair of pinchers, a hammer, and an adjustable saw-set combined and arranged in a novel manner and in the combination of these devices with a tack-puller and a screw-driver arranged upon the extremities of the pincher-handles.

Referring to the drawings, A and B indicate the jaws of the pinchers, and A' B' the handles, the two parts being pivoted together at X. Upon the back of the jaw A, near its outer extremity, a hammer-head C is formed integral with the jaw. Between the hammer-head and the pivot a thumb-screw D extends through a threaded opening in the jaw in a direction substantially parallel with the hammer-head and at right angles to the inner face of the jaw. Opposite the thumb-screw is a notch or recess d at the rear end of the inner face of the jaw B. The bottom of this recess inclines upward and forward and intersects the face of the jaw, forming an angular fulcrum or shoulder b. The set-screw D might be placed in the jaw B and the recess d formed in the jaw A; but I prefer to construct the tool as shown in the drawings, for the reason that the hammer-head protects the screw from injury and prevents it from being accidentally displaced while the saw-set is being used. The handles A' B' are formed at their outer extremities into a screw-driver and a claw for pulling tacks and nails.

Figs. 2 and 3 illustrate the manner of using the tool as a saw-set. As shown in Fig. 2, the saw S is inserted between the jaws A B, with one of the teeth under the set-screw D and the base of the tooth upon the shoulder or fulcrum b. As the jaws are closed, the saw is clamped between the nose a, the shoulder b, and the thumb-screw D, and upon further closing the jaws the tooth is bent down upon the inclined bottom of the recess d. It will be evident that as the screw D is turned farther into the jaw that less set will be given to the saw-tooth. Thus in Fig. 3 the screw is shown projecting considerably farther from the face of the jaw A than in Fig. 2. In this case when the jaws are closed upon the saw a much smaller movement will bring the tooth down upon the inclined bottom of the recess and less set will be given to it.

The above-described tool may be manufactured of any suitable material, such as steel, wrought-iron, or malleable cast-iron, steel being preferable.

Having described my invention, what I claim, and desire to secure by Letters Patent, is—

1. In a combination-tool, the pinchers having jaws A B of equal length, one of said jaws being provided with a nose a and a thumb-screw D and the other jaw having a fulcrum b and a recess d opposite the thumb-screw, substantially as described.

2. In a combination-tool, the pinchers having the jaws A B pivoted at X, the jaw A, having a hammer-head C and a thumb-screw between the hammer-head and the pivot, the jaw B, having a recess d opposite the thumb-screw and a fulcrum b, formed at the intersection of the face of the jaw and the bottom of the recess, and handles A' B', terminating, respectively, in a screw-driver and a tack-puller, substantially as described.

In testimony whereof I affix my signature in presence of two witnesses.

LEONARD HINKLE.

Witnesses:
RUSSELL C. KELSEY,
E. C. MUNSON.